March 24, 1942.    E. J. ALPAUGH    2,277,195
WINDOW WIPER
Filed May 19, 1941    2 Sheets-Sheet 1
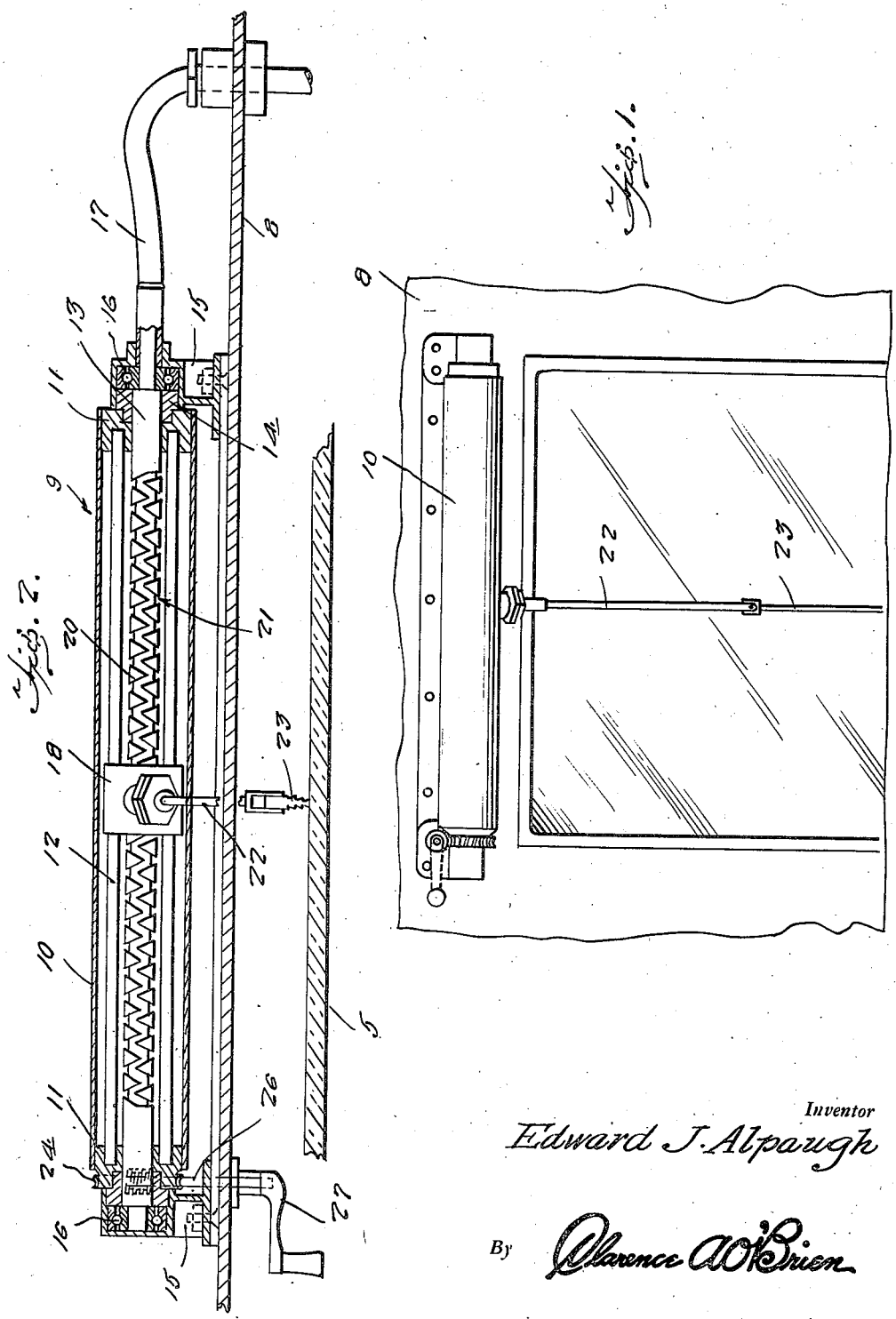
Inventor
Edward J. Alpaugh
By Clarence A. O'Brien
Attorney

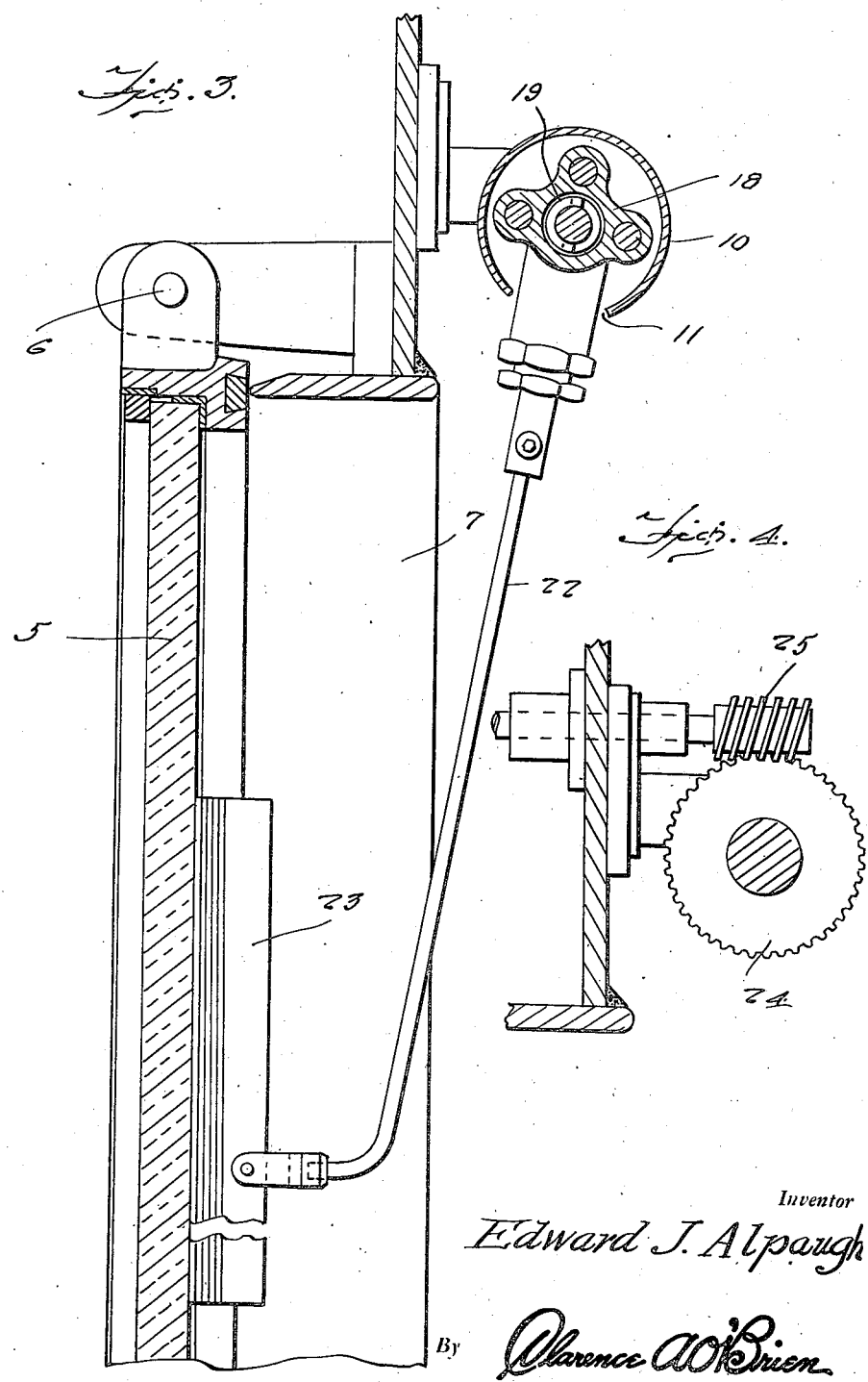

Patented Mar. 24, 1942

2,277,195

UNITED STATES PATENT OFFICE 2,277,195

WINDOW WIPER

Edward J. Alpaugh, New York, N. Y.

Application May 19, 1941, Serial No. 394,174

3 Claims. (Cl. 15—253)

The present invention relates to new and useful improvements in window wipers embodying a motor driven reciprocating wiping arm, and the invention has for its primary object to provide means operable from the inside of the window to move the wiper into or out of position for engaging the outer surface of the window.

A further object is to provide an apparatus of this character of simple and practical construction, which is efficient and reliable in performance, neat and attractive in appearance, relatively inexpensive to manufacture and install in operative position adjacent the window, and otherwise well adapted for the purposes for which it is intended.

Other objects and advantages reside in the details of construction and operation as more fully hereinafter described and claimed, reference being had to the accompanying drawings forming part hereof, wherein like reference numerals refer to like parts throughout, and in which—

Figure 1 is a front elevational view of a window showing the wiper in position relative thereto.

Figure 2 is a longitudinal sectional view through the wiper.

Figure 3 is a vertical sectional view, and

Figure 4 is a detail of the worm drive connection for swinging the wiper into an out of window engaging position.

Referring now to the drawings in detail, wherein for the purpose of illustration I have disclosed a preferred embodiment of the invention, the numeral 5 designates a window hinged at its upper edge as shown at 6 of a type usually installed on boats and provided with the port-hole frame 7. It will be understood, however, that the window may be of any suitable construction. The wall or side of the pilot house in which the window is mounted is designated at 8 and secured to the outer surface of the wall immediately above the window is the window wiping mechanism designated generally at 9 which includes a tube 10 having a longitudinal slot 10' formed therein, each end of the tube being closed by plugs 11—11 in which the ends of a plurality of spaced parallel rods 12 are secured, the rods extending longitudinally of the tube 10 as shown in Figure 2 of the drawings.

The ends of a shaft 13 are journalled in each of the plugs 11—11, the ends of the shaft also being journalled in bushings 14—14 recessed in the outer ends of the plugs 11—11 and the bushings are mounted in attaching brackets 15—15 secured to the outer surface of the wall 8. Each of the brackets 15—15 carry ball bearing assemblies 16—16 and to one end of the shaft 13 is secured a flexible drive shaft 17 extending through the wall 8 for connection to a suitable source of power, such as an electric motor (not shown).

Slidably mounted on the rods 12 is the carrier 18 having the central opening 19 formed therein through which the shaft 13 is inserted, the intermediate portion of the shaft being formed with the oppositely formed grooves 20 to form the reversing screw designated generally at 21 for engagement by the usual dog carried by the follower 18 for reciprocally actuating the follower during the rotation of the screw.

Projecting laterally from the follower 18 is the wiper arm 22 having the wiper blade 23 carried thereby for engaging the outer surface of the window 5, the wiper arm being movable through the slot 10' of the tube 9.

The plug 11 disposed at the end of the tube 10 opposite from the drive shaft 17, is provided with a worm gear 24 engaged by a worm 25 formed on the outer end of a shaft 26 which is journalled in the wall 8 and provided at its inner end with a manually operable crank 27.

The wiper blade 23 is reciprocably actuated in the usual manner through the reversing screw 21 in a manner to move the wiper back and forth across the outer surface of the window for the purpose of cleaning the same. When it is desired to remove the wiper blade 23 out of engagement with the outer surface of the window the crank 27 is actuated whereby to rotate the plugs 11 and tube 10 through the gears 24 and 25 whereby to bodily rotate the tube 10 and thus swing the wiper away from engagement with the window.

Likewise it will be apparent that through the actuation of the crank 27 the wiper 23 may be adjusted relative to the window 5 to increase or decrease the pressure of the wiper against the surface of the window and by reason of the worm and worm gear construction the adjustment will be maintained.

It is believed the details of construction, operation and manner of use of the device will be readily understood from the foregoing without further detailed explanation.

Having thus described my invention, what I claim as new is:

1. A window wiper comprising a tubular housing, brackets rotatably supporting the ends of the housing outwardly of a window, said housing having a longitudinal slot, a mechanically actuated wiper arm projecting through the slot for reciprocating movement, said arm having a blade thereon, a gear on the housing, and means operable inwardly of the window for actuating the gear and rotating the housing to swing the blade toward or away from the window.

2. A window wiper comprising a tubular housing, brackets rotatably supporting the ends of the housing outwardly of a window, said housing having a longitudinal slot, a mechanically actuated wiper arm projecting through the slot for reciprocating movement, said arm having a blade thereon, a worm gear carried by the housing, a worm engaged therewith and operating means for the worm positioned inwardly of the window for rotating the housing to swing the blade toward or away from the window.

3. A window wiper comprising a tubular housing having a longitudinal slot, plugs in each end of the housing, a reversing screw having its ends freely mounted in the plugs, said screw having drive means connected to one end thereof, brackets rotatably supporting the ends of the housing, a plurality of rods disposed longitudinally in the housing and connecting the plugs, a carrier slidably mounted on the rods and operable by the screw, a wiper arm attached to the carrier and projecting through the slot, said arm having a blade attached thereto, a worm gear on one of the plugs, a worm engaged therewith and a manually operated crank inwardly of the window and connected to the worm for rotating said housing to swing the wiper arm toward or away from the window.

EDWARD J. ALPAUGH.